United States Patent [19]

Dorbeck

[11] Patent Number: 4,708,124
[45] Date of Patent: * Nov. 24, 1987

[54] CONTROL OF HYDROGEN PERMEATION ESPECIALLY IN SOLAR COLLECTORS

[75] Inventor: Leo R. Dorbeck, Campbellville, Canada

[73] Assignee: Canadian Sun Systems Ltd., Campbellville, Canada

[*] Notice: The portion of the term of this patent subsequent to Nov. 24, 2002 has been disclaimed.

[21] Appl. No.: 255,234

[22] Filed: Apr. 17, 1981

[30] Foreign Application Priority Data

Apr. 21, 1980 [GB] United Kingdom ................ 8013032

[51] Int. Cl.⁴ ................................................ F24J 3/02
[52] U.S. Cl. .................................... 126/438; 126/442; 126/439; 138/114; 165/134.1
[58] Field of Search ............... 126/442, 438, 439, 440; 138/113, 148, 104, 114, 111, 149; 165/134, 70

[56] References Cited

U.S. PATENT DOCUMENTS

| 2,386,747 | 10/1945 | Ris | 138/111 |
| 2,508,774 | 5/1950 | Roberts | 138/149 X |
| 3,227,153 | 1/1966 | Godet et al. | 126/438 |
| 3,440,140 | 4/1969 | Sawatzky | 165/134 R |
| 3,830,290 | 8/1974 | Thamasett et al. | 138/104 X |
| 4,182,399 | 1/1980 | Popplewell | 165/134 R |
| 4,222,372 | 9/1980 | Bogatzki | 126/443 |
| 4,256,146 | 3/1981 | Genini et al. | 138/111 |
| 4,343,350 | 8/1982 | Campbell et al. | 165/134 R |

Primary Examiner—Larry Jones
Attorney, Agent, or Firm—Sim & McBurney

[57] ABSTRACT

Hydrogen permeations through a ferritic pipe from a heat conducting aqueous fluid to a heated surface, such as, in a solar collector, is prevented by the utilization of a composite pipe structure which includes means to intercept and convey radially flowing hydrogen.

7 Claims, 4 Drawing Figures

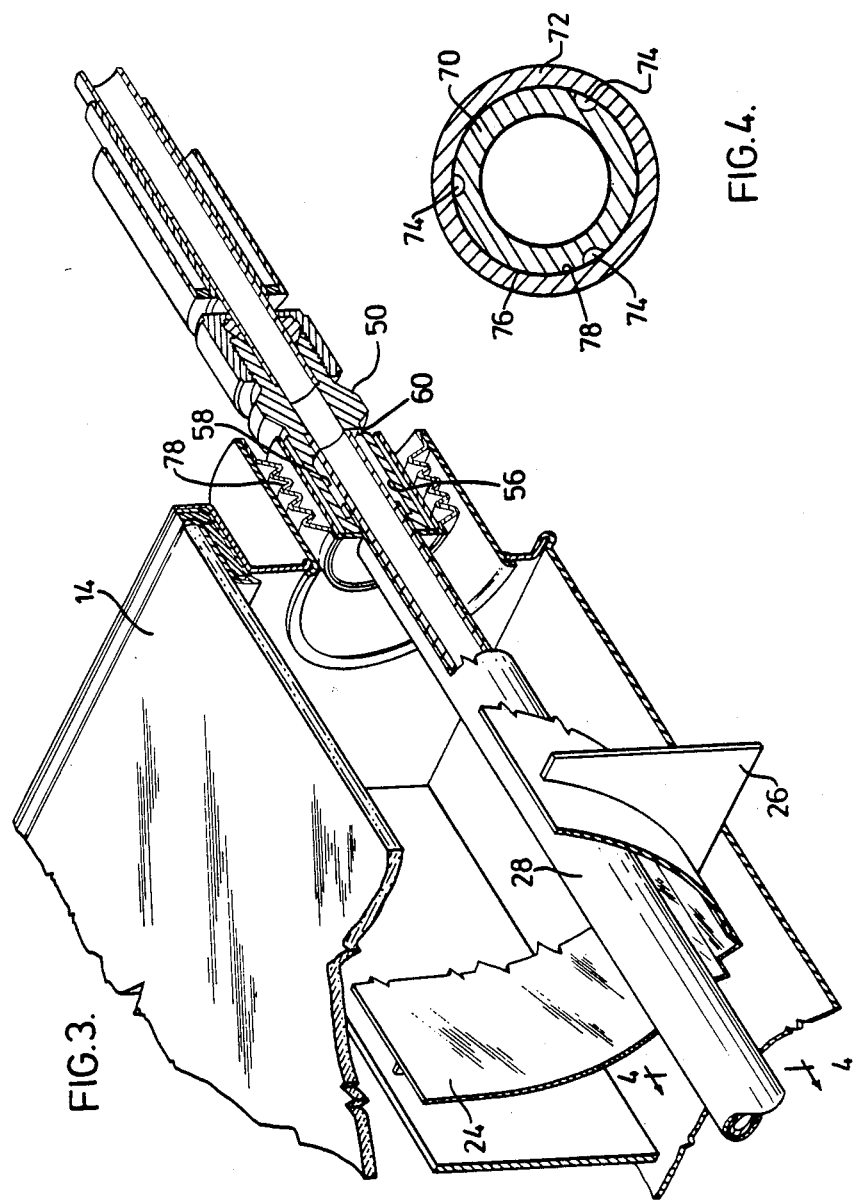

CONTROL OF HYDROGEN PERMEATION ESPECIALLY IN SOLAR COLLECTORS

FIELD OF INVENTION

The present invention relates to the control of hydrogen permeation in solar collectors.

BACKGROUND TO THE INVENTION

In my U.S. Pat. No. 4,198,955 the disclosure of which is incorporated herein by reference, there is described a solar energy collection system using compound parabolic concentrators (CPC's). A CPC collector is characterized by a compound parabolic shape which concentrates solar energy received through the aperture of the parabola onto a tube through which fluid to be heated is passed. The parabolic shape is determined by the relationship of the concentration ratio (C), i.e., the ratio of the transverse width of the aperture to the outer circumference of the tube, to the acceptance angle ($\theta$), which is the angle to the axis of the parabola within which light rays are concentrated on the tube. The relationship is $$C = 1/\sin\theta$$

In the aforementioned U.S. Patent, there is described a solar energy collection system which is comprised of modular solar collectors. Each module comprises a plurality of elongate envelopes physically joined together in fixed immovable relationship to each other in an integral body structure and a transparent cover sealingly joined to the body structure. Each envelope is evacuated and has a CPC-shaped reflective inner surface. A tube having a selectively absorbing surface for selectively absorbing energy having predetermined wavelengths passes sequentially through the envelopes. The tube conveys fluid to be heated to the module and removes heated fluid from the module.

For ease of fabrication and assembly and for strength reasons, we have extensively used metals, notably steel, in constructing the modular system. A typical construction is illustrated in my copending U.S. application Ser. No. 101,808 filed Dec. 10, 1979, now U.S. Pat. No. 4,309,984, the disclosure of which is incorporated herein by reference.

The use of steel as the material of construction of the absorber tube has led to the formation of corrosion-generated hydrogen in the heat conveying fluid. This hydrogen permeates the steel tube into the evacuated envelope, thereby increasing the pressure therein. The loss of vacuum in this way is highly undesirable, since the efficiency of the collector is significantly diminished at lesser vacuum levels. Tests have determined that gettering of the evacuated space to remove the hydrogen is not a satisfactory solution to the problem. In addition, the hydrogen permeation causes embrittlement of the tube and eventual fatigue cracking.

This problem is not limited to the solar energy field. For example, the nuclear industry continues to experience serious problems in heat exchanger cores due to the cracking of condenser tubes particularly where the metal tube has experienced severe cold working during fabrication and assembly operations. The hydrogen apparently alters the composition of the alloy steel at specific stress areas resulting in a modification of the physical characteristics of the capability of the steel to sustain the dynamics of operational loads. The result is hydrogen-initiated cracking.

Numerous methods have been attempted to deal with this hydrogen problem in various industries. They range from the use of high alloy steels to the use of additives to the water transport fluid. All attempts to date have failed to deal effectively with the problem.

SUMMARY OF INVENTION

The present invention provides a solution to this problem by providing means associated with the absorber tube to prevent corrosion-generated hydrogen from permeating into the evacuated space. The present invention is not limited to the solar energy field but has application in any device wherein permeation of corrosion-generated hydrogen represents a problem.

The formation of the hydrogen by reaction between the steel and water at room temperature is depicted by the equation:

$$Fe + 2H_2O \rightarrow Fe(OH)_2 + H_2$$

As the water temperature increased above 50° C., the ferrous hydroxide transforms into ferric hydroxide which subsequently plates out on the inside of the heat transfer surface:

$$3Fe(OH)_2 \rightarrow Fe_3O_4 + H_2 + H_2O$$

Under conditions that could be encountered by the collector under conditions of stagnation, such as, a temperature of 300° C. and a pressure of 1500 psi, the formation of hydrogen within the steel tube would be accelerated by an order of magnitude.

Atomic hydrogen is formed and is located within the fissures of the steel, unaffected by any fluid flow within the confining piping. The combination of water temperature, pressure and vacuum around the absorber tube causes the atomic hydrogen to migrate through the interstices of the steel pipe. Once the atomic hydrogen has permeated the wall of the pipe, combination to form molecular hydrogen occurs. The molecular hydrogen increases the pressure in the vacuum space and, if unchecked, subsequently voids the purpose of the vacuum.

The atomic hydrogen in the course of its migration through the steel results in the formation of methane gas by reaction with the carbon alloyed within the steel, most notably at elevated temperatures, in accordance with the equation:

$$C + 2H_2 \rightarrow CH_4$$

The problem presented by such atomic hydrogen migration has been overcome by preventing the hydrogen from permeating to the vacuum space.

BRIEF DESCRIPTION OF DRAWINGS

FIG. 3 is a perspective view, partly in section, of a modified form of the collector of FIG. 1; and FIG. 4 is a sectional view taken on line 4—4 of FIG. 3 illustrating a second embodiment of the invention.

DESCRIPTION OF PREFERRED EMBODIMENT

Figure 1:
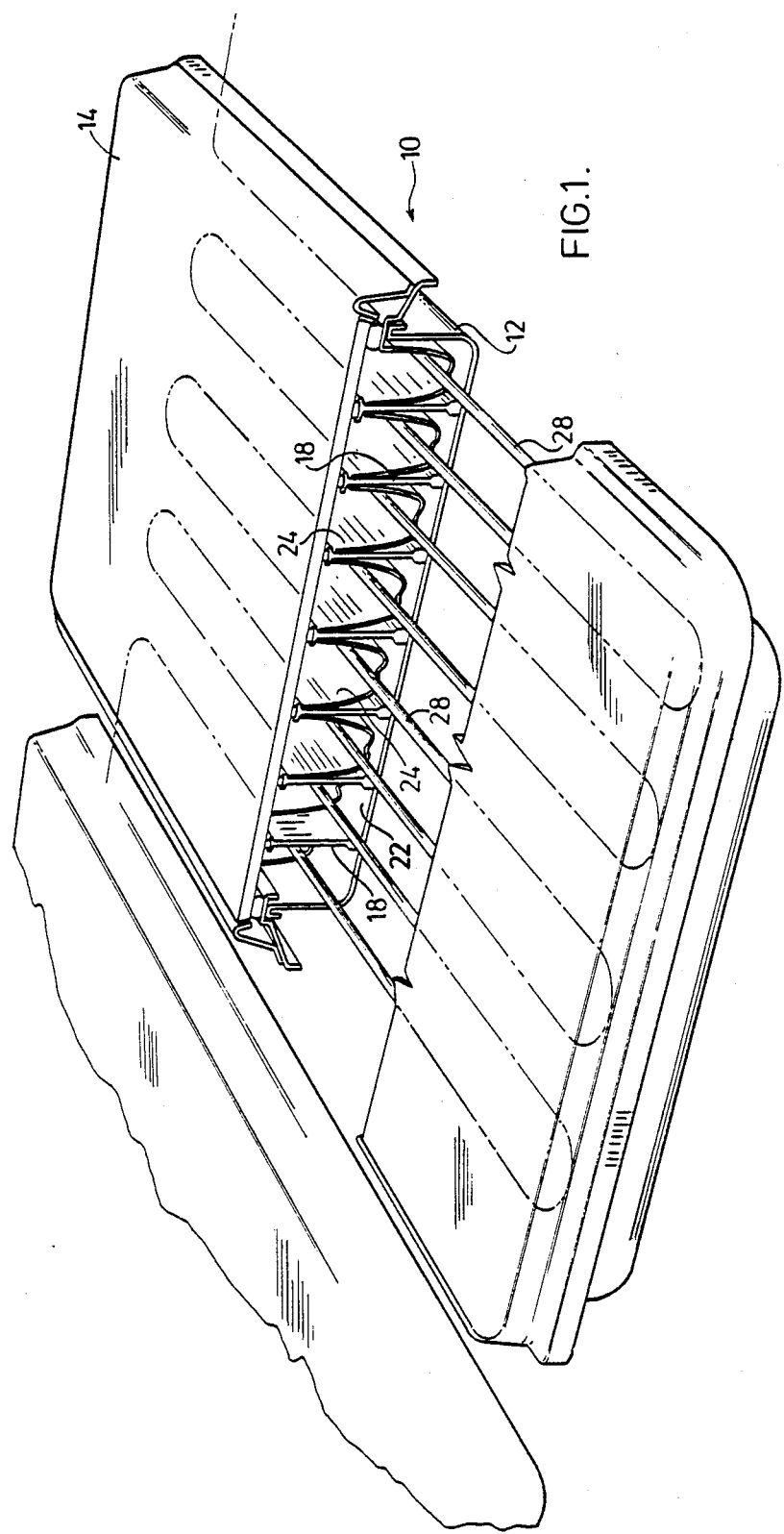
FIG. 1 is a perspective view, with parts cut away for clarity, of a modular solar collector to which the invention may be applied.

Referring first to FIG. 1, a modular solar collector 10 comprises a tray-like lower member 12, constructed of any convenient material, typically steel, and a transparent cover member 14, constructed of any convenient material, typically glass, hermetically sealingly joined to the lower tray portion 12 to define a vacuum enclosure 16.

A plurality of parallel upright walls 18 extend longitudinally within the enclosure 16 and from the base of the tray 12 to the cover member 14 to define with each other and with the side walls 20 of the tray a plurality of parallel compartments 22. Located in each of the compartments 22 is a CPC-type reflector 24 which is supported therein by a plurality of transversely-extending supports 26. The transversely-extending supports 26 are of thin transversed dimension and shaped to receive the reflector 24.

The modular collector 10 is illustrated in FIG. 1 as having eight reflectors 24. However, this is by way of example, and the modular collector may have any desired number of reflectors 24 supported in respective compartments 22.

An absorber tube 28 passes sequentially through each compartment 22 normally at the focus of the reflector 24 for conveying aqueous transport fluid to be heated through the modular collector 10. The absorber tube 28 has an outer coating layer of a material, such as, chromeblack, which selectively absorbs energy of a certain wavelength, generally about $3 \times 10^{-7}$ to about $3 \times 10^{-6}$ meters, while not absorbing other wavelengths. The use of a selectively absorbent material coating in this way minimizes heat losses from the tube 28 through radiation. The construction of the absorber tube 28 is discussed in more detail below when the specific embodiments of the invention are described.

Figure 2:
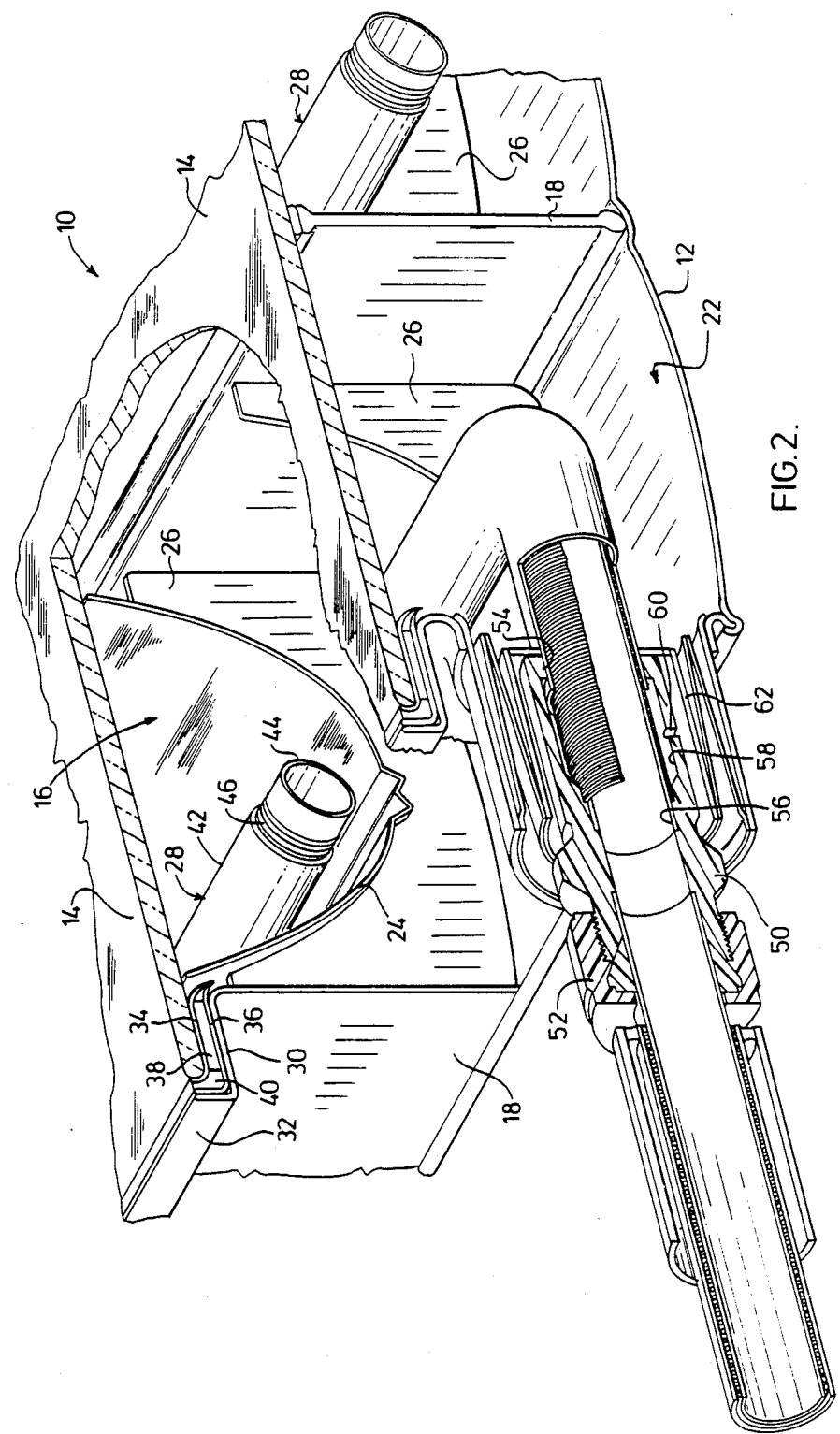
FIG. 2 is a perspective view, partly in section, of a portion of the solar collector of FIG. 1 illustrating one embodiment of the invention.

The evacuated nature of the module 10, which improves the solar energy absorbing efficiency, requires sealing of the cover 14 to the tray 12. As seen in FIG. 2, the periphery of the tray 12 is provided with a horizontal outwardly-extending rim 30 having an upstanding flange 32.

The glass cover 12 has a glass-to-metal seal to a metal strip 34 which is electron beam welded to a metal strip 36 which itself is electron beam welded to the rim 30 and flange 32, with a suitable pad 38 located between the metal strips 34 and 36. A shock-absorbing fillet 40 is provided between the metal strips 34 and 36 adjacent the flange 32 and may overlie the exposed edges of the strips and flange.

This glass-to-metal seal arrangement is efficient in maintaining the internal vacuum and the flexibility of the sealing arrangement resulting from the pad 38 and fillet 40 located between the two strips 34 and 36 which are jointed together only at one edge thereof, allows the glass to bend along two parallel edges of the cover 14 so as to minimize stresses in the edge seal area. When the glass cover 14 is deflected due to atmospheric loading the outer surface of the glass cover 14 is in compression while the underside of the glass cover is in tension. An alternative sealing arrangement is provided in FIG. 1.

Referring now to FIG. 2, which illustrates one embodiment of the invention, the problem of hydrogen migration through the absorber tube 28 to the evacuated space 16 between the cover 14 and the reflector 24 is solved by fabricating the absorber tube 28 as a composite assembly.

The composite assembly comprises two concentric tubes 42 and 44 separated from each other but in thermal contact with each other through a layer 46 of tightly wound wire. The inner tube 44, through which the aqueous transport fluid flows, usually constructed of steel or other ferritic material, is wrapped with a wire of any convenient diameter, for example, about 0.025 to about 0.045 inches in diameter, and which is continuous in each turn of wire in contact with adjacent turns.

The outer tube 42 bearing the selectively absorbent material may be fabricated from steel, or from a material having a lower thermal coefficient of expansion than the inner tube 44 to permit this tube to be heated and subsequently contracted around the wire-wrapped inner tube 44.

The wire wrap 46 provides a thermal path for the absorber tube assembly 28 and at the same time provide a trap for any atomic hydrogen or methane penetrating the wall of the inner tube 44. The hydrogen and methane are intercepted and conducted to an open end of the composite assembly, thereby preventing atomic hydrogen from penetrating the outer tube 42 and forming hydrogen in the evacuated space 16 and thereby destroying the vacuum.

In order to assist in ensuring that an intimate contact is maintained between the wire wrap 46 and the outer and inner tubes 42 and 44 respectively, the inner tube 44 of the composite assembly may be hydraulically expanded or expanded using a mandrel. In addition, the wire wrap 46 may be coated with a thermally-stable and conductive material, for example, graphite prior to envelopment by the outer tube 42. Such coating material does not impede the flow of hydrogen to the end of the tube assembly but does have the capacity to inhibit the intrusion of moisture from the atmosphere into the voids created by the wire wrap 46.

As may be seen in FIG. 2, at the exit from the modular unit 10, the absorber tube 28 passes through the side wall 20 into a connector piece 50 through which the modular unit is connected to the next modular unit, such as by connecting nut 52. The connector piece 50 includes axial bores 54 and 56 which communicate with a cylindrical cavity 58 of diameter greater than the bores 54 and 56.

The outer tube 42 of the composite assembly of the absorber tube 28 is brazed, or otherwise mounted, into the bore 54 and terminates a short distance into the cavity 58. The inner tube 44 and the wire wrap 46 are brazed into the bore 56, so that the wire wrap 46 is exposed in the cavity 58. Molecular hydrogen passing along the wire wrap 46 thereby accumulates in the cavity 58.

An opening 60, or a plurality of such openings, establishes communication between the cavity 58 and an annular cylinder 62 which is open to atmosphere, therby permitting the hydrogen to vent from the cavity 58. The cylinder 62 is mounted in the wall 20 of the module in the manner illustrated, which minimizes thermal conductivity from the collector tube 28 to the wall 20, while the vacuum integrity is maintained. If desired, the venting of the hydrogen from between the outer and inner tubes 42 and 44 may be assisted using a pump applied to the space with which the openings 60 communicate.

In order to increase the effective area of the outer tube 42, this surface also may be wrapped with wire, which may be of larger diameter than the wire forming the wire wrap 46, for example, up to about 0.1 inches in diameter. Where such a structure is provided, a space between each turn may be provided, for example, up to the radius of the wire. This arrangement effectively increases the absorber surface area and also provides a trap for the incoming radiation. The outer wire wrap may be brazed to the surface of the absorber tube to provide an effective thermal path.

The absorber tube 28 also may be continuously finned using a slanted orientation to the tube axis with the radially outer extremities of the fins turned so that they are located 90° to the tube axis. This arrangement has the advantage of minimizing the emissivity of the tube 28.

Referring now to FIGS. 3 and 4, there is illustrated therein an alternative form of the absorber tube 28. In this embodiment, the absorber tube comprises an inner tube 70 and an outer tube 72 intimately contacting the inner tube 70. A plurality of long pitch spiral grooves or riflings 74 is provided in the outer surface 76 of the inner tube 70 to define, with the inner surface 78 of the outer tube 72, a plurality of spirally-extending channels which trap and convey the migrating hydrogen and methane.

As in the case of the embodiment of FIG. 2, the absorber tube 28 passes through the side wall 18 into a connector piece 50 through which the modular unit is connected to the next modular unit. A bellows 78 flexibly and hermetically mounts the absorber tube 28 in the side wall 18.

The molecular hydrogen and methane passing along the passages 74 accumulates in the cavity 58 and is vented through opening 60 or a plurality of such openings. The venting may be assisted by a pump applied to the cavity 58 via the opening 10.

The hydrogen-conveying grooves 74 are provided in spiral fashion in the outer surface 76 of the inner tube 70, if desired. Although more difficult to fabricate, the grooves 74 may be provided on the inner surface 78 of the outer tube 72.

The two concentric tubes 70 and 72 are suitably manipulated to form a tight fitting assembly, such as, by shrink fitting or hydraulic expansion. The concentric tubes thereby are in intimate thermal contact with one another.

The design illustrated in FIGS. 3 and 4 also has particular utility in the design of heat exchanger tubes, where tube failures have been traced to thermal cracking caused by hydrogen permeation, and permeation of isotopic forms of hydrogen, such as, tritium, for example, in the nuclear industry.

One alternative to rifling the inner tube 70 takes the form of a controlled abrasive treatment of the outer surface of the inner tube, by axially rotating the inner tube in contact with a course abrasive grit material to produce a continuous spiralling helix along the full length of the tube. In this way a plurality of parallel microgrooves along the full length of the tube may be formed to provide multiple paths for venting gases.

A further alternative means for preventing the passage of hydrogen from the transport fluid to the evacuated space through the absorber tube of a solar collector involves wrapping the inner tube with wire or with broad bands of metal ribbon. A nickel brazing solution then is introduced between the tube and the wrap, so that upon firing in a vacuum furnace, the nickel flows and totally covers the tube through capillary action between the wrap and the tube, thereby providing a coating which is very resistive to permeation by hydrogen.

SUMMARY OF DISCLOSURE

In summary of this disclosure, the present invention is directed to the prevention of hydrogen permeation through steel pipes, especially for solar collector and heat exchanger applications. Modifications are possible within the scope of the invention.

What I claim is:

1. In a solar collector, comprising
   an evacuated enclosure having a transparent upper surface,
   at least one elongate focussing reflector located in said enclosure to receive light through the transparent upper surface and focus the same, and
   an absorber tube normally located at the focus of the reflector for conveying an aqueous fluid to be heated into the compartment and for removing heated fluid from the compartment,
   the improvement wherein:
   said absorber tube comprises an inner tubular member having an inner surface and an outer surface and constructed of ferritic material, an outer tubular member having an inner surface and an outer surface and being in heat conducting relationship with said inner tubular member, and means preventing gaseous material from passing through the absorber tube from said fluid to said evacuated enclosure.

2. The solar collector of claim 1, wherein said prevention means comprises at least one gaseous flow path within and extending generally longitudinally of said absorber tube for intercepting gaseous material flowing generally radially of the absorber tube and venting means for venting said intercepted gaseous material from said flow path externally of said enclosure.

3. The solar collector of claim 2, wherein said at least one gaseous flow path is established by a continuous wire tightly wrapped around the outer surface of the inner tubular member and tightly engaged by the inner surface of the outer tubular member.

4. The solar collector of claim 2, wherein said at least one gaseous flow path is provided by a plurality of channels formed in the outer surface of said inner tubular member and extending in generally parallel fashion helically along the length of the pipe and said inner and outer tubular members tightly engage each other.

5. The collector of claim 4 wherein said plurality of channels extend helically.

6. The solar collector of claim 3 or 4, wherein said venting means is provided by a chamber communicating with said flow path externally of the enclosure for receiving therein gaseous material conveyed along said flow path and also communicating with ambient atmosphere to permit said received gas to pass therefrom.

7. The collector of claim 3 wherein said wire has a diameter of about 0.025 to about 0.045 inches.

* * * * *